(12) United States Patent
Brenner

(10) Patent No.: US 12,168,370 B1
(45) Date of Patent: Dec. 17, 2024

(54) HUB GUARD

(71) Applicant: Dustin James Brenner, Lindon, UT (US)

(72) Inventor: Dustin James Brenner, Lindon, UT (US)

( * ) Notice: Subject to any disclaimer, the term of this patent is extended or adjusted under 35 U.S.C. 154(b) by 396 days.

(21) Appl. No.: 17/671,435

(22) Filed: Feb. 14, 2022

(51) Int. Cl.
*B60B 7/06* (2006.01)

(52) U.S. Cl.
CPC .................................. *B60B 7/066* (2013.01)

(58) Field of Classification Search
CPC ............ B60B 7/066; B60B 7/068; B60B 7/20
USPC ........................................................ 301/108.4
See application file for complete search history.

(56) References Cited

U.S. PATENT DOCUMENTS

| | | | | |
|---|---|---|---|---|
| 3,170,733 A * | 2/1965 | Lamme | ..................... | B60B 7/16 |
| | | | | 301/37.38 |
| 3,287,067 A * | 11/1966 | Brown | ..................... | B60B 7/02 |
| | | | | 301/37.38 |
| 3,833,266 A * | 9/1974 | Lamme | ..................... | B60B 7/16 |
| | | | | 301/37.21 |
| 4,004,837 A * | 1/1977 | Main | ..................... | B60B 7/08 |
| | | | | 301/37.42 |
| 4,306,751 A * | 12/1981 | Wegner | ..................... | B60B 7/18 |
| | | | | 403/337 |
| 4,410,217 A * | 10/1983 | Loren | ..................... | B60B 7/068 |
| | | | | 301/37.29 |
| 4,932,724 A * | 6/1990 | Wright | ..................... | B60B 7/02 |
| | | | | 301/108.4 |
| 5,263,770 A * | 11/1993 | Goudey | ..................... | B60B 7/04 |
| | | | | 301/108.4 |
| 5,676,430 A | 10/1997 | Wright et al. | | |
| 7,547,076 B2 | 6/2009 | Necaise | | |
| 7,731,300 B2 | 6/2010 | Gerstenslager et al. | | |
| 7,988,239 B1 * | 8/2011 | Baker | ..................... | B60B 7/20 |
| | | | | 301/37.371 |
| 2008/0174167 A1 * | 7/2008 | Necaise | ..................... | B60B 7/20 |
| | | | | 301/108.4 |
| 2008/0252137 A1 * | 10/2008 | Necaise | ..................... | B60B 3/16 |
| | | | | 301/108.4 |

FOREIGN PATENT DOCUMENTS

JP          S61117001 U   *  7/1986

* cited by examiner

*Primary Examiner* — Kip T Kotter

(74) *Attorney, Agent, or Firm* — Plager Schack LLP; Mark H. Plager, Esq.; Naomi Mann, Esq.

(57) ABSTRACT

A hub guard configured to install to a wheel hub assembly and to protect a hub cap of the wheel hub assembly is disclosed. In embodiments, the hub guard is configured to permit access to the hub cap for inspection, maintenance, and performance of various operations.

9 Claims, 4 Drawing Sheets

HUB GUARD

BACKGROUND

The present disclosure relates to wheel hub assemblies and hub caps.

Conventional wheel end hubs or hub caps are generally fragile and may be easily broken. Certain hub caps, such as grease, oil, and/or dust hub caps may have an exposed plastic window or aluminum cap which is particularly susceptible to damage. As such, there is a need for an improved system for protecting hub caps.

SUMMARY

According to various embodiments, disclosed is a hub guard configured to install to a wheel hub assembly and to protect a hub cap of the wheel hub assembly. Additionally, the hub guard is configured to permit access to the hub cap for inspection and handling, while the hub guard is installed to the hub assembly. In some embodiments, the hub guard may comprise a lower base plate configured to mount the hub guard to the hub assembly, the hub assembly configured to receive a hub cap. The hub guard may further include a plurality of vertical risers which are coupled to the lower base plate and extend upwards from the lower base plate. In further embodiments, the hub guard may comprise an outer deflection component coupled to the plurality of vertical risers opposite the lower base plate, wherein the plurality of vertical risers and the outer deflection component are configured to provide a protective structure around the hub cap when the hub guard and the hub cap are is mounted to the hub assembly. In certain embodiments, the lower base plate comprises a first flat arced segment and a second flat arced segment, the first arced segment and second arced segment being coplanar and separated by gaps, and further outlining a first circular ring. In some embodiments, the outer deflection component comprises a flat plate outlining a second circular ring. In certain embodiments, the first circular ring outlined by the first arced segment and the second arced segment has an internal diameter which is larger than an internal diameter of the second circular ring outlined by the outer deflection component. In some embodiments, the plurality of vertical risers are separated by gaps, wherein a first set of the plurality of vertical risers extend from the first flat arced segment to the outer deflection component, and wherein a second set of the plurality of vertical risers extend from the second flat arced segment to the outer deflection component.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
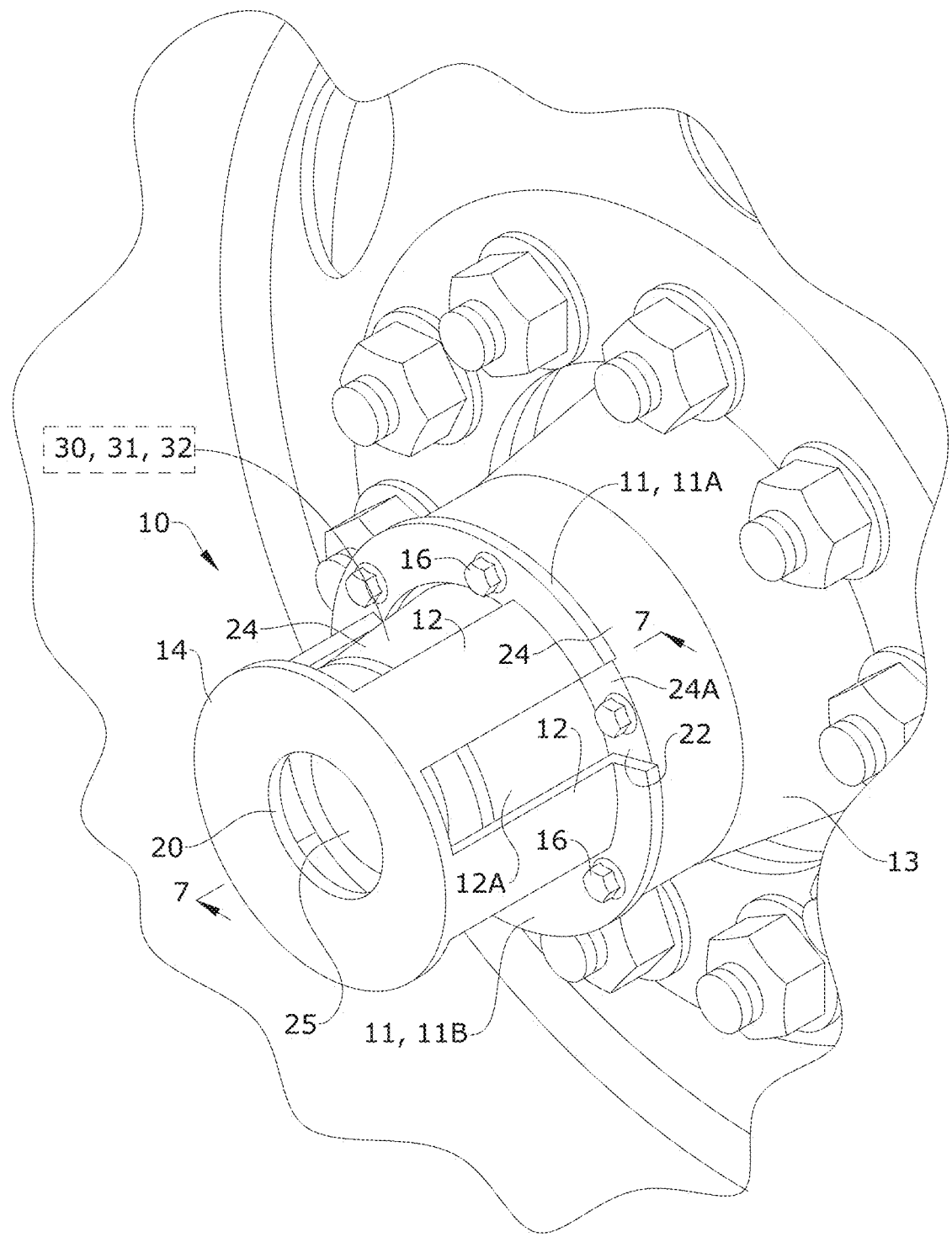
FIG. 1 is a perspective view of a hub guard shown in use, and in accordance with certain embodiments.
Figure 2:
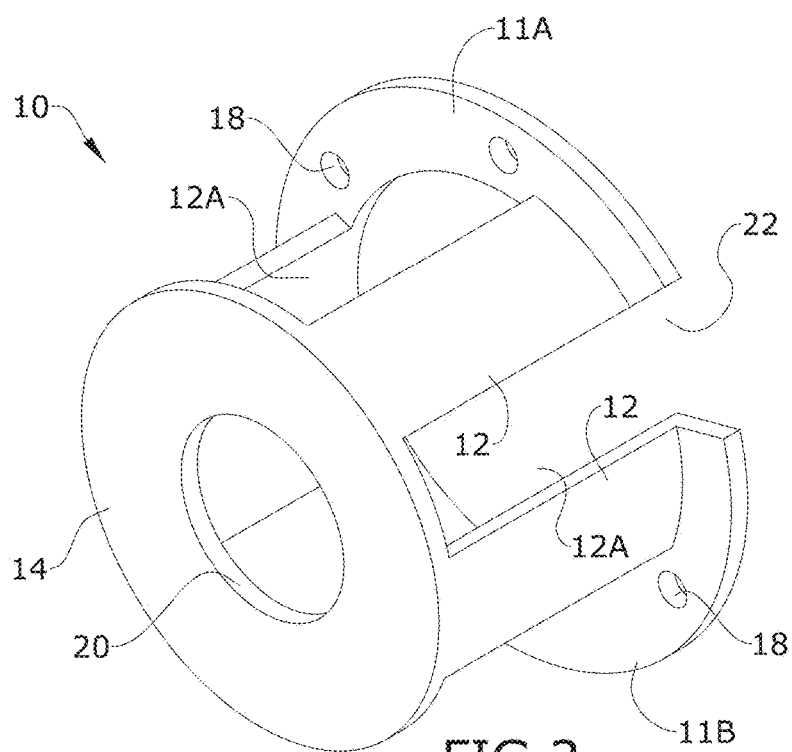
FIG. 2 is a perspective view of the hub guard.
Figure 3:
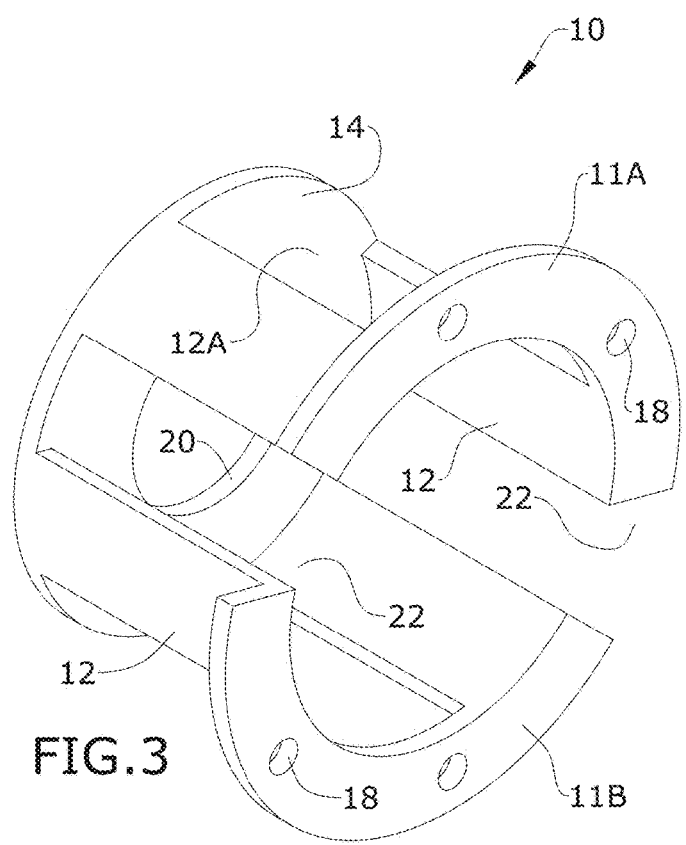
FIG. 3 is a rear perspective view of the hub guard.
Figure 4:
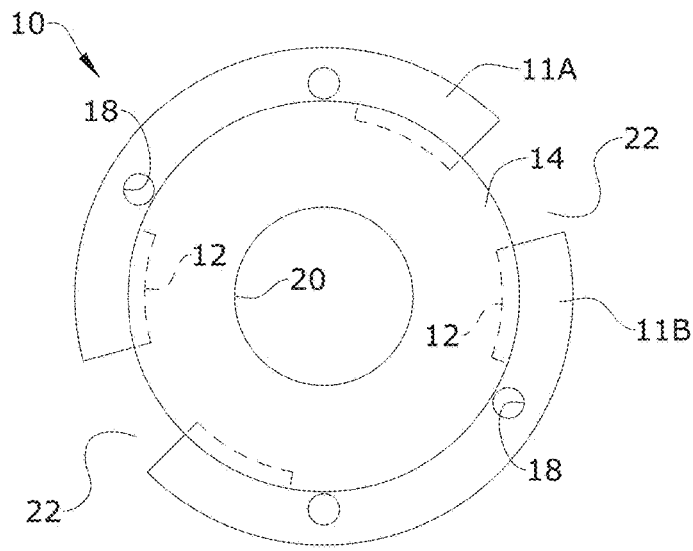
FIG. 4 is a front view of the hub guard.
Figure 5:
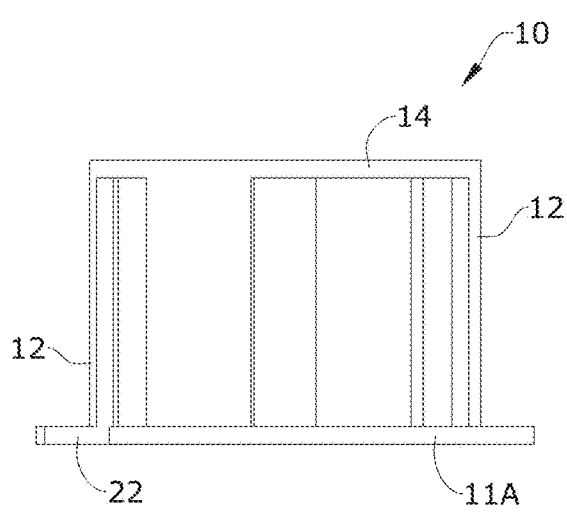
FIG. 5 is a side view of the hub guard.
Figure 6:
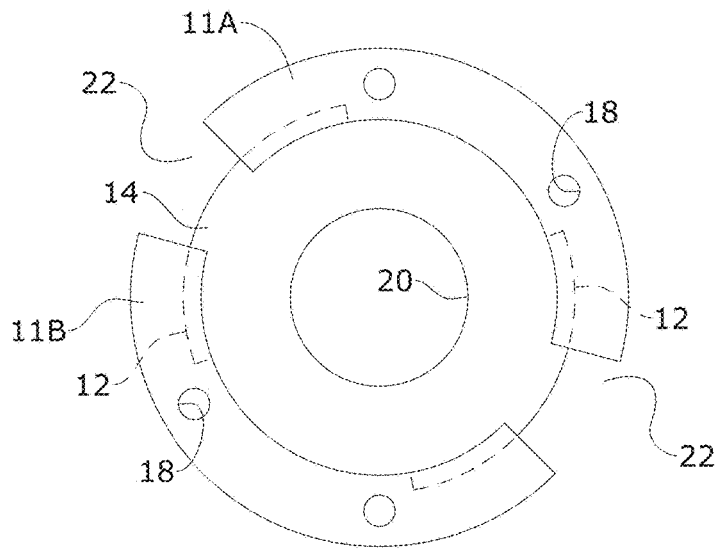
FIG. 6 is a rear view of the hub guard.
Figure 7:
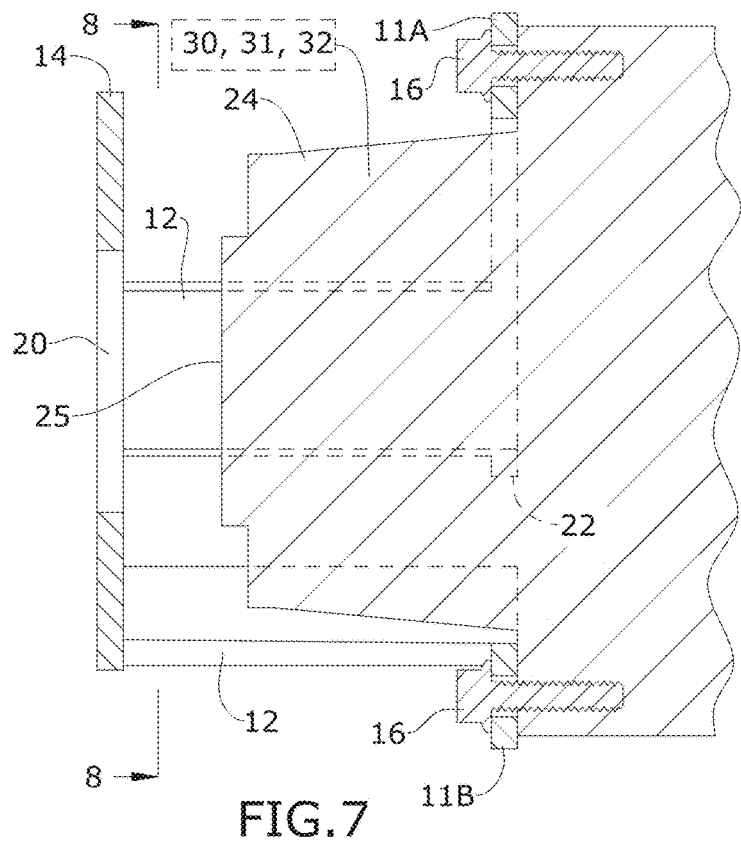
FIG. 7 is a section view taken along line 7-7 in FIG. 1.
Figure 8:
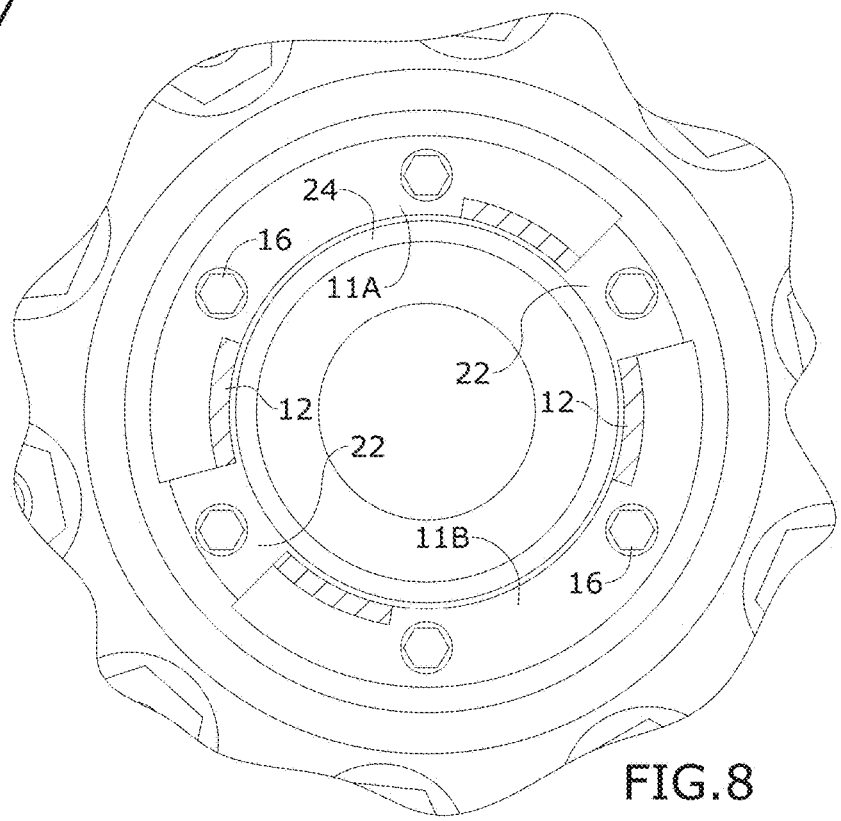
FIG. 8 is a section view taken along line 8-8 in FIG. 7.

According to various embodiments as depicted in FIGS. 1-7, disclosed is a hub guard 10 configured to mount to a wheel hub assembly 13 and to protect a hub cap 24 of the wheel hub assembly. Additionally, hub guard 10 is further configured to permit access to the hub cap while installed to the hub assembly, as will be described.

In embodiments, hub guard 10 may be used with different types of hub caps and/or hub assemblies. In some embodiments, hub cap 24 may include a hub cap window 25 at an outer end of the hub cap. In certain embodiments, hub cap window 25 may be transparent to enable inspection of the oil or grease level. In some embodiments, hub cap 24 may include components such as an oil valve and/or removable fill plug through which oil may be introduced into the hub assembly.

In some embodiments, hub cap 24 may include an air hose 30 for inflation of a central tire inflation system. When installed to the wheel hub assembly, hub guard 10 is configured to protect hub cap 24 including hub cap widow 25 from damage, while enabling a user to inspect and access the various components of the hub cap, such as the hub cap window 25, oil valve 31, fill plug 32, and/or air hose 30, etc., for carrying out various operations. Such operations may include inspection of the oil/grease level through hub cap window, access to the oil valve 31/oil fill plug 32 for filling oil, and/or access to the air hose 30/tire inflation system.

In embodiments, hub guard 10 may comprise a lower base plate 11 configured to mount to hub assembly 13. In some embodiments, hub cap 24 may be mounted to hub assembly 13 via a plurality of threaded bolts 16, which may be inserted through aligned holes within hub cap 24 and hub assembly 13. In one embodiment, bolts 16 may insert through holes provided within an external circular mounting base 24A of hub cap 24, and through threaded holes within hub assembly 13. In certain embodiments, lower base plate 11 of hub guard 10 may have a ring structure corresponding to the structure of mounting base 24A. Lower base plate 11 may further have holes 18 configured to align with the holes of the hub cap mounting base and hub assembly. As such, threaded bolts 16 may be inserted through holes 18 of lower base plate 11, and through the holes of hub cap mounting base 24A and hub assembly 13 to attach hub guard 10 to hub assembly 13 together with the hub cap.

In some embodiments, gaps 22 may be provided within lower base plate 11. In one embodiment, gaps 22 may divide lower base plate 11 into a first base plate half 11A and a second base plate half 11B. Gaps 22 enable some of the plurality of threaded bolts 16 to be used for direct attachment of hub cap 24 to hub assembly 13, while the remaining bolts are used to attach both the hub cap 24 and hub guard 10. In this manner, hub guard 10 may be removed from hub assembly 13 without removing hub cap 24, as the bolts 16 which directly attach the hub cap to the hub assembly (i.e. within gaps 22) may remain in place to hold the hub cap. In one embodiment, four bolts may be used to attach the hub guard together with the hub cap to the hub assembly, while two bolts may be used between gaps 22 to attach the hub cap directly to the hub assembly. It shall be appreciated that different number of bolts may be used in alternate embodiments. It shall further be appreciated that various types of fasteners and attachment mechanisms may be employed for attachment of hub guard 10 in alternate embodiments. For example, stabilizers or clamps may be used in some alternate embodiments for added securement of hub guard 10 to the hub assembly.

In further embodiments, hub guard 10 may include a plurality of vertical risers 12 which extend upwards from base plate 11 and connect base plate 11 to an outer deflection component 14. In embodiments, outer deflection component 14 is configured to deflect and/or protect hub cap 24/hub cap window 25 from flying debris or other impact. In some embodiments, outer deflection component may be a flat plate. In some embodiments, outer deflection component 14 may include an opening 20, which may be a circular central opening, through which the outer end of hub cap 24 or hub cap window 25 may be accessed or viewed. Accordingly, outer deflection component 14 may have a flat plate ring structure in certain embodiments. Additionally, vertical risers 12 provide vertical openings 12A between adjacent risers, which also permit physical and viewing access to hub cap 24. As such, vertical risers 12 and outer deflection component 14 provide a protective structure around hub cap 24, while openings 12A and 20 enable inspection, maintenance, and handling of hub cap 24/hub assembly 13.

In one embodiment, hub guard 10 may comprise a first pair of rises 12 extending from the first base plate half 11A, and a second pair of risers 12 extending from second base plate half 11B. In further embodiments, the risers may be positioned adjacent the ends of the base plate halves as shown in the figures, but are not limited to this option. Additionally, lower base plate 11 and outer deflection component 14 may have planar surfaces which are parallel one another, and generally perpendicular to a planar surface of risers 12, as shown. It shall be appreciated however, that components of hub guard 10 are not necessarily planar and may have different geometric configurations in alternate embodiments.

It shall be appreciated that hub guard 10 may be used with various types of hub caps and/or hub cap assemblies. Furthermore, the size and structure of the components of hub guard 10 may be designed based on the size, structure, and/or features of hub cap 24, hub assembly 13 and/or industry regulations.

Hub guard 10 creates an expanded and resilient impact area that protects the hub cap and hub cap widow from flying debris and other impact. This may prevent hub cap 24 from leaking and other damage, which saves on repair costs and loss of vehicle use time. As openings 12A and 20 are configured to permit physical and viewing access to components such as a hub window, an air hose 30, oil valve 31, fill plug 32, etc. which may be provided within the hub cap and/or hub cap assembly, a user may perform various operations, maintenance, and/or inspection of hub cap 24 and/or hub assembly 13 through openings 12A and 20 without removing hub guard 10. Openings 12A may further enable debris captured within hub guard 10 to be pulled or fall out of hub guard 10. It shall be appreciated that hub guard 10 may incorporate other openings of various sizes, which may enable user access to the hub cap and/or caught debris to clear out of the hub guard.

In some embodiments, hub guard 10 may be manufactured from steel, wherein the risers may be welded to the base plate, and the deflection ring may be welded to the risers opposite the base plate. However, it shall be appreciated that the components of hub guard 10 described herein may comprise any alternative known materials in the field and be of any size and/or dimensions, and that hub guard 10 may be manufactured and assembled using any known techniques in the field.

In embodiments, hub guard 10 may be installed by removing pre the existing hardware of the hub assembly, such as bolts 16, and installing hub guard 10 over the hub cap, using either bolts 16 of the existing hub assembly, or new hardware. Hub guard 10 may be installed to all exposed hub caps of a vehicle. The hub guard and hub caps may then be inspected periodically for damage or debris. Any debris caught inside the hub guard may be removed and/or the hub guard itself may be removed for cleaning or replacement without removal of the hub cap.

It shall be appreciated that the disclosed hub guard can have multiple configurations in different embodiments. It shall be appreciated that the disclosed hub guard 10 may be used for different types of hub caps/hub assemblies, and for different type of vehicles, including semi-trucks, trailers, and smaller vehicles. It shall be appreciated that the components of hub guard 10 described herein may be of any size and/or dimensions.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A hub guard, comprising:
    a lower base plate configured to mount the hub guard to a hub assembly, the hub assembly configured to receive-a hub cap;
    a plurality of vertical risers which are coupled to the lower base plate and extend upwards from the lower base plate;
    an outer deflection component coupled to the plurality of vertical risers opposite the lower base plate,
    wherein the plurality of vertical risers and the outer deflection component are configured to provide a protective structure around the hub cap when the hub guard and the hub cap are mounted to the hub assembly,
    wherein the lower base plate comprises a first flat arced segment and a second flat arced segment, the first arced segment and second arced segment being coplanar and separated by gaps, and further outlining a first circular ring,
    wherein the outer deflection component comprises a flat plate outlining a second circular ring,
    wherein the first circular ring outlined by the first arced segment and the second arced segment has an internal diameter which is larger than an internal diameter of the second circular ring outlined by the outer deflection component,
    wherein the plurality of vertical risers are separated by gaps, wherein a first set of the plurality of vertical risers extend from the first flat arced segment to the outer deflection component, and wherein a second set of the plurality of vertical risers extend from the second flat arced segment to the outer deflection component.

2. The hub guard of claim 1, wherein the outer deflection component includes an opening configured to permit inspection of an outer end of the hub cap and/or a window of the hub cap when the hub guard is mounted to the hub assembly.

3. The hub guard of claim 1, wherein the gaps separating the plurality of vertical risers provide openings between adjacent vertical risers of the plurality of vertical risers that allow access to the hub cap when the hub guard is mounted to the hub assembly.

4. The hub guard of claim 1, wherein the lower base plate is configured to align with a circular mounting base of the hub cap.

5. The hub guard of claim 4, wherein the lower base plate includes a plurality of holes configured to align with holes within the circular mounting base of the hub cap, and with holes within the hub assembly, wherein the hub guard can be mounted to the hub assembly by inserting bolts through aligned holes within the lower base plate, the circular mounting base, and the hub assembly, such that the circular mounting base of the hub cap is captured between the lower base plate and the hub assembly.

6. The hub guard of claim 5, wherein the gaps in the lower base plate permit direct attachment of the hub cap to the hub assembly via bolts inserted through aligned holes within the circular mounting base of the hub cap and hub assembly.

7. The hub guard of claim 1, wherein the lower base plate and the outer deflection component are coplanar, and wherein the plurality of vertical risers each have a planar surface which is perpendicular to the surfaces of the lower base plate and the outer deflection component.

8. The hub guard of claim 1, wherein the hub cap comprises an oil valve and/or removable fill plug, and wherein the hub guard comprises at least one opening through which the oil valve and/or removable fill plug can be accessed when the hub guard is mounted to the hub assembly.

9. The hub guard of claim 1, wherein the hub cap comprises an air hose, and wherein the hub guard comprises at least one opening through which the air hose can be accessed when the hub guard is mounted to the hub assembly.

* * * * *